US008892228B2

(12) United States Patent
Muesch

(10) Patent No.: US 8,892,228 B2
(45) Date of Patent: Nov. 18, 2014

(54) CONCEALING AUDIO ARTIFACTS

(75) Inventor: Hannes Muesch, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 573 days.

(21) Appl. No.: 12/996,817

(22) PCT Filed: Jun. 9, 2009

(86) PCT No.: PCT/US2009/046692
§ 371 (c)(1),
(2), (4) Date: Dec. 8, 2010

(87) PCT Pub. No.: WO2009/152124
PCT Pub. Date: Dec. 17, 2009

(65) Prior Publication Data
US 2011/0082575 A1 Apr. 7, 2011

Related U.S. Application Data

(60) Provisional application No. 61/060,342, filed on Jun. 10, 2008.

(51) Int. Cl.
*G06F 17/00* (2006.01)
*G10L 21/00* (2013.01)
*H04R 3/02* (2006.01)
*G10L 19/005* (2013.01)

(52) U.S. Cl.
CPC .................................... *G10L 19/005* (2013.01)
USPC ............................. 700/94; 704/226; 381/73.1

(58) Field of Classification Search
USPC ................. 700/94; 704/202, 255, 200.1, 226; 370/216, 516; 381/73.1
See application file for complete search history.

(56) References Cited

U.S. PATENT DOCUMENTS

| | | | | |
|---|---|---|---|---|
| 5,673,363 | A * | 9/1997 | Jeon et al. | 704/270 |
| 5,870,397 | A * | 2/1999 | Chauffour et al. | 370/435 |
| 5,890,112 | A * | 3/1999 | Kitabatake | 704/229 |
| 5,907,822 | A * | 5/1999 | Prieto, Jr. | 704/202 |
| 6,144,936 | A * | 11/2000 | Jarvinen et al. | 704/226 |
| 6,208,618 | B1 * | 3/2001 | Kenney et al. | 370/216 |

(Continued)

FOREIGN PATENT DOCUMENTS

| | | |
|---|---|---|
| CN | 1679082 | 10/2005 |
| JP | 2007135128 | 5/2007 |

(Continued)

OTHER PUBLICATIONS

Perkins, et ar' A Survey of Packet Loss Recovery Techniques for Streaming Audio, IEEE Network, IEEE Seviced Center, New York, US, vol. 12, No. 5, Sep. 1, 1998, pp. 40-48.*

(Continued)

*Primary Examiner* — Ken Vanderpuye
*Assistant Examiner* — Dibson Sanchez

(57) ABSTRACT

At least one segment is identified in an audio signal. The audio segment is associated with an artifact within the audio signal and has a time duration. At least one stored sound clip is retrieved, which has a time duration that exceeds the time duration associated with the audio segment. The retrieved sound clip is mixed with the audio signal and the retrieved sound clip audibly compensates for the audio artifact.

14 Claims, 5 Drawing Sheets

(56) References Cited

U.S. PATENT DOCUMENTS

| | | | | |
|---|---|---|---|---|
| 6,389,006 | B1 * | 5/2002 | Bialik | 370/352 |
| 6,421,802 | B1 * | 7/2002 | Schildbach et al. | 714/747 |
| 6,614,370 | B2 * | 9/2003 | Gottesman | 341/94 |
| 6,665,637 | B2 * | 12/2003 | Bruhn | 704/206 |
| 6,823,176 | B2 * | 11/2004 | Rogers | 455/67.13 |
| 6,845,389 | B1 | 1/2005 | Sen | |
| 6,922,669 | B2 * | 7/2005 | Schalk et al. | 704/255 |
| 6,968,309 | B1 * | 11/2005 | Makinen et al. | 704/219 |
| 7,061,912 | B1 * | 6/2006 | Anandakumar et al. | 370/392 |
| 7,069,208 | B2 * | 6/2006 | Wang | 704/211 |
| 7,090,582 | B2 | 8/2006 | Danieli | |
| 7,376,127 | B2 * | 5/2008 | Hepworth et al. | 370/352 |
| 7,596,488 | B2 * | 9/2009 | Florencio et al. | 704/208 |
| 7,650,280 | B2 * | 1/2010 | Tsuchinaga et al. | 704/207 |
| 7,797,161 | B2 * | 9/2010 | Kapilow | 704/500 |
| 7,835,916 | B2 * | 11/2010 | Bruhn | 704/500 |
| 7,916,874 | B2 * | 3/2011 | Shirakawa et al. | 381/56 |
| 8,200,481 | B2 * | 6/2012 | Xu et al. | 704/206 |
| 8,335,579 | B2 * | 12/2012 | Lin | 700/94 |
| 2001/0028634 | A1 * | 10/2001 | Huang et al. | 370/252 |
| 2002/0035468 | A1 * | 3/2002 | Taori | 704/207 |
| 2003/0108030 | A1 | 6/2003 | Gao | |
| 2003/0125936 | A1 * | 7/2003 | Dworzak | 704/211 |
| 2003/0216178 | A1 | 11/2003 | Danieli | |
| 2003/0216181 | A1 * | 11/2003 | Danieli et al. | 463/39 |
| 2003/0220787 | A1 * | 11/2003 | Svensson et al. | 704/207 |
| 2004/0019479 | A1 * | 1/2004 | Hillis et al. | 704/200.1 |
| 2004/0063497 | A1 | 4/2004 | Gould | |
| 2004/0146168 | A1 * | 7/2004 | Goubran et al. | 381/73.1 |
| 2005/0002388 | A1 | 1/2005 | Gao | |
| 2005/0043959 | A1 * | 2/2005 | Stemerdink et al. | 704/500 |
| 2005/0044471 | A1 * | 2/2005 | Chia et al. | 714/776 |
| 2006/0045139 | A1 * | 3/2006 | Black et al. | 370/516 |
| 2006/0095262 | A1 | 5/2006 | Danieli | |
| 2006/0111899 | A1 * | 5/2006 | Padhi et al. | 704/221 |
| 2006/0193671 | A1 * | 8/2006 | Yoshizawa et al. | 400/208 |
| 2007/0038463 | A1 * | 2/2007 | Tischer | 704/276 |
| 2007/0208557 | A1 * | 9/2007 | Li et al. | 704/200.1 |
| 2007/0260462 | A1 * | 11/2007 | Andrsen et al. | 704/270 |
| 2008/0187153 | A1 * | 8/2008 | Lin | 381/94.7 |

FOREIGN PATENT DOCUMENTS

| | | |
|---|---|---|
| WO | 03015884 | 2/2003 |
| WO | 2004019175 | 3/2004 |
| WO | 2005107277 | 11/2005 |

OTHER PUBLICATIONS

Warren, Perceptual restoration of missing sounds, Science, New Series, vol. 167, Jan. 23, 1970, pp. 392-393.*

Tseng et al., "User Perceived Codec and Duplex Aware Playout Algorithms and LMOS-DMOS Measurement for Real Time Streams", p. 1666-1669 vol. 2, publication date: 2003, Country of Publication: China.

Begen, "Enhancing the Multimedia Experience in Emerging Networks", a Thesis presented to The Academic Faculty, Georgia Institute of Technology, Dec. 2006, pp. 1-187.

Perkins, et al"A Survey of Packet Loss Recovery Techniques for Streaming Audio", IEEE Network, IEEE Seviced Center, New York, US, vol. 12, No. 5, Sep. 1, 1998, pp. 40-48.

* cited by examiner

CONCEALING AUDIO ARTIFACTS

RELATED APPLICATION AND PRIORITY CLAIM

This Application claims the benefits, including priority, to related co-pending U.S. Provisional Patent Application No. 61/060,342 filed on 10 Jun. 2008 by Hannes Muesch, entitled Concealing Audio Artifacts, which is assigned to the Assignee of the present Application (with Dolby Laboratories Ref. No. D07046 US01).

TECHNOLOGY

The present invention relates to audio signal processing. More specifically, embodiments of the present invention relate to concealing audio artifacts.

BACKGROUND

Modern audio communication may involve transmission of audio information over a packet switched network, such as the interne. Audio communication over packet switched networks may be a feature of telephony, online computer gaming, video and teleconferencing, and other applications.

For example, multiplayer online computer gaming may involve live voice communication among the various game players. In this context, the voice communication path may encompass a voice coder, the output of which is packetized and relayed to the other game players via a packet switched network.

Applications, situations or issues described in this section could be pursued, but have not necessarily been previously conceived or pursued. Unless otherwise indicated, it should not be assumed that any approaches described in this section qualify as prior art merely by virtue of their inclusion herein. Similarly, issues identified with respect to one or more applications or situations should not be assumed to have been recognized in any prior art on the basis of this section, unless otherwise indicated.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
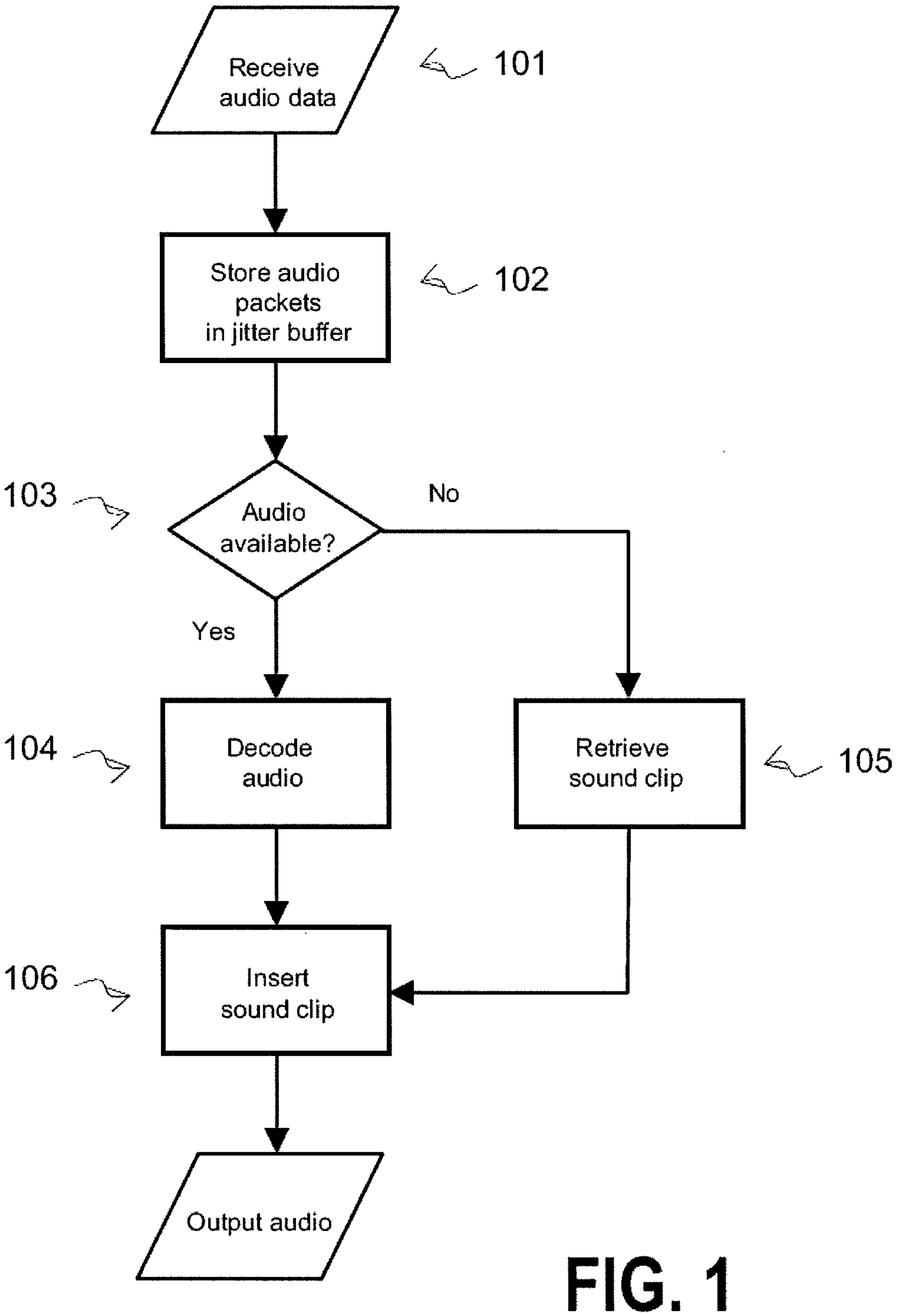
FIG. 1 depicts a flowchart for a first example process, according to an embodiment of the present invention.

Example embodiments relating to concealing audio artifacts are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid occluding, obscuring, or obfuscating the present invention.

Overview

Embodiments of the present invention relate to concealing audio artifacts. At least one segment is identified in an audio signal. The audio segment is associated with an artifact within the audio signal and has a time duration. At least one stored sound clip is retrieved, which has a time duration that matches or exceeds the time duration associated with the audio segment. The retrieved sound clip is mixed with the audio signal and the retrieved sound clip audibly compensates for the audio artifact.

Embodiments of the invention exploit a psychological phenomenon known as continuity illusion or temporal induction. To facilitate understanding the embodiments of the invention, this phenomenon is now explained:

As used herein, the terms continuity illusion and temporal induction relate to an auditory illusion, in which a listener perceives an interrupted first sound as continuous, if a second sound prevents the listener from obtaining evidence that the interruption in the first sound occurred.

For example, if a continuous tone is periodically interrupted by a series of gaps, a listener will cease to hear a continuous tone and instead will perceive a series of pulsating discrete tones. If a second sound is introduced, for example a series of noise bursts, that occur during the times where the tone is interrupted, and if the spectrum and level of the noise are such that it would mask the tone if it were not interrupted, a listener will cease to hear the tone as interrupted. Instead, the listener will perceive an uninterrupted (e.g., continuous) tone alongside a series of noise bursts. The addition of the second sound (noise bursts) creates the illusion of the first sound (interrupted tone) being continuous.

From hereon, the first sound will be referred to as the "target sound," and the second sound will be referred to as the "masker" or "masking sound."

For the continuity illusion to occur two conditions must be met: First, the listener must have a reasonable expectation of the target signal being continuous. Expectations of continuity derive from context. For example, having heard the initial phrase of a sentence, a listener expects to hear the final word of that sentence also. Second, the masker must prevent the listener from obtaining any evidence of the interruption of the target sound. A masking sound prevents a listener from obtaining evidence of the interruption when the auditory representation of the masker completely overlaps the auditory representation of the target sound that the listener expects to hear during the time period of the interruption. The overlap must be complete with regard to temporal location and magnitude of the auditory representation.

Examples of suitable auditory representations are the excitation of the basilar membrane and the firing pattern in the auditory nerve, or mathematical models thereof.

The continuity illusion can be evoked with simple signals, such as tones, and with complex signals, such as music or speech. The addition of an appropriately placed masking sound to an interrupted speech signal does not only give the illusion of continuous, uninterrupted speech but also enables the language centers in the brain to use contextual information to "fill in" the missing speech segments, thus aiding in speech comprehension.

Embodiments of the invention function to conceal brief audio artifacts that result from faulty audio transmission by evoking the continuity illusion through the addition of strategically placed masking sounds. The embodiments described provide methods for selecting or generating masking signals that are both effective in evoking the continuity illusion and appropriate for the listening environment.

Example Processes

FIG. 1 depicts a flowchart for a first example process 100, according to an embodiment of the present invention. In step 101, packets of data in an audio signal are received (e.g., with an audio receiver). The audio signal may comprise a series of audio data packets. In step 102, the received audio data packets are buffered (e.g., stored temporarily in a jitter buffer associated with the audio receiver). An audio decoder associated with the audio receiver that receives the audio data packets, may reach or assume a state in which the decoder is ready to receive the next audio packet in the series of packets that comprise the audio signal for sequential decoding.

In step 103, the jitter buffer is queried in relation to the buffered audio packets. If the audio packet is available in or from the jitter buffer, then in step 104, the buffered audio packet is passed to the decoder. However, if the requested audio packet is not available, the decoder either generates a prediction of the missing audio signal or inserts a gap that has a temporal duration corresponding to that of the missing packet into the decoded audio stream.

As used herein, the term 'masking' may relate to rendering an audio signal inaudible by presenting a 'masking sound' or 'masker' whose auditory representation completely overlaps the auditory representation of the audio signal that is being masked. Like other audio information, masking sounds may be classified, codified, indexed, stored, retrieved from storage, and/or rendered. Masking sounds may be stored and retrieved from storage in media that include, but are not limited to, a computer memory, storage disk or static drive, or an audio repository or database.

In step 105, a sound clip, which functions as a masking sound in relation to the gap (or predicted signal portion), is retrieved from a storage medium. In step 106, the retrieved masking sound clip is mixed (e.g., inserted) into the decoded audio signal in substantial temporal correspondence with the gap (or distortion) in the audio signal.

In the context of the present discussion, the notion of "masking a gap" may refer to providing a masking sound that is an effective masker of a signal that the listener would reasonably expect to hear at the time the gap occurs.

An embodiment provides a function that relates to the continuity illusion where the masking sound substantially (e.g., completely) masks a sound that is significantly similar (e.g., identical, substantially identical, closely approximate) to the missing or corrupted signal portion. An embodiment thus functions to match the level of the masker and its spectral characteristics with that required to mask the gap or predicted signal portion.

Figure 2:
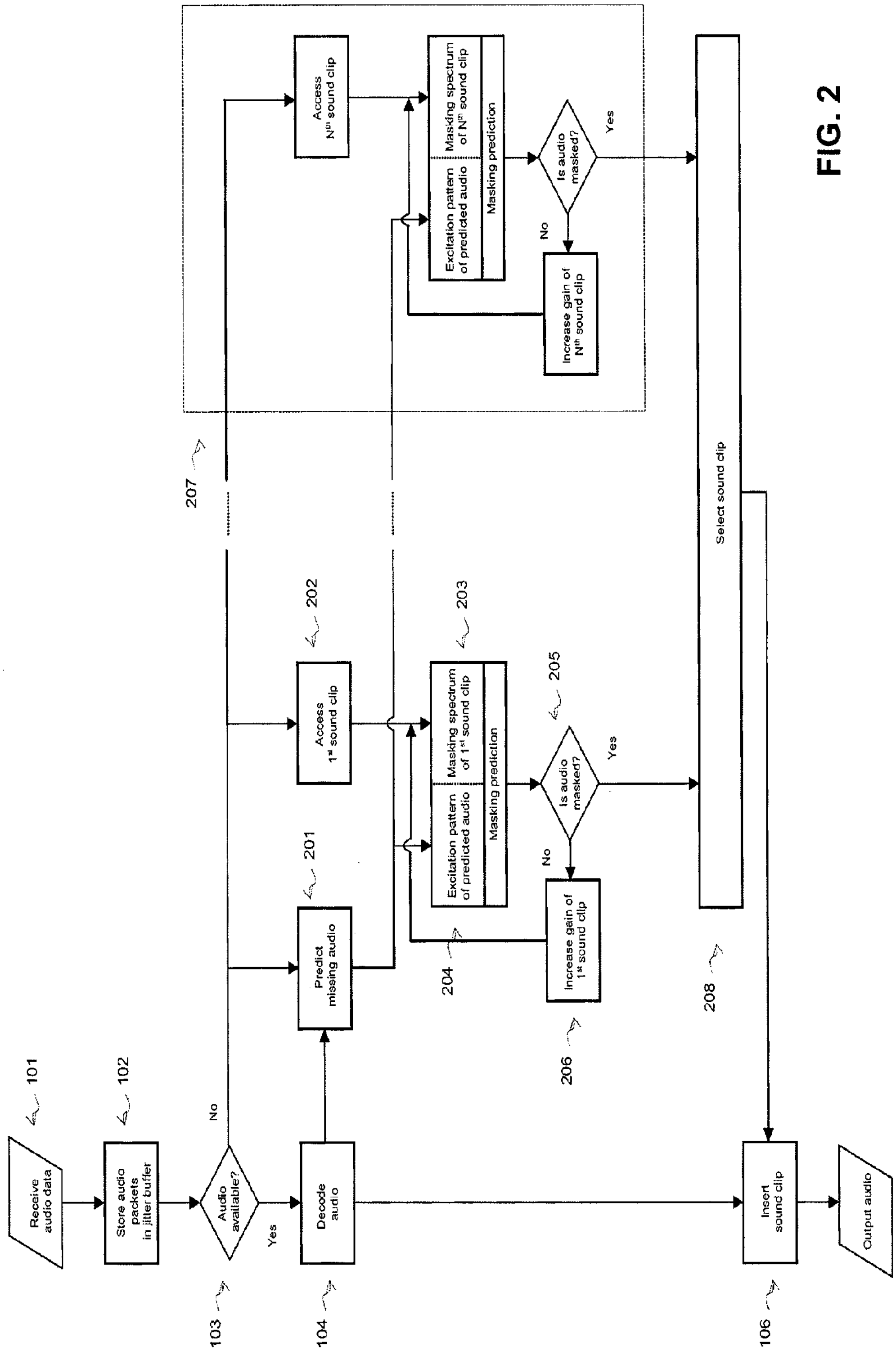
FIG. 2 depicts a flowchart for a second example process, according to an embodiment of the present invention.

For example, an embodiment functions to adjust the masker's level, so that the masker level suffices to mask the gap or defect, in the context of the remainder of the received audio signal. Also for example, an embodiment functions to adjust the masker's frequency composition, so that the frequency composition is suitable for masking the gap or defect, in the context of the remainder of the received audio signal. Process 100 may function with relatively high-level, broadband masking sounds, which may suffice to mask gaps of expected duration or expected distortions in audio signals that may be received or encountered FIG. 2 depicts a flowchart for a second example process 200, according to an embodiment of the present invention. In an embodiment, process 200 executes with one or more steps or step sequences of process 100 (FIG. 1). Thus, process 200 may begin with step 101, in which the audio data packets are received. In step 102, the received audio packets are stored, e.g., temporarily, in a jitter buffer. Upon an audio decoder in condition (e.g., ready) to receive a subsequent (e.g., the next) audio packet in the audio stream for decoding, in step 103 the jitter buffer is queried. If a stored audio packet is available, then in step 104, the packet is passed to the decoder. If the requested audio packet is not available however, then the decoder inserts a gap or a prediction of the missing audio into the decoded audio.

Upon inserting the gap or predicted audio into the decoded audio, a first masking sound is retrieved from storage in step 202. In step 203, an auditory representation (e.g., the auditory masking pattern) corresponding to the first masking sound is calculated.

In step 201 a characteristic of the missing (or corrupted) audio data is predicted. For example, one or more characteristics of missing audio data may be derived by repeating an audio segment that preceded the missing segment.

In step 204, an auditory representation (e.g., excitation pattern) produced by the predicted signal is calculated. In step 205, the calculated auditory representation of the predicted signal is compared with the auditory representation of the first retrieved masker. If the comparison reveals that the masker does not completely mask the predicted audio signal, then a small fixed gain is applied to the masker in step 206 and the masking calculation is repeated. This iterative process may continue until the masker essentially completely masks the predicted audio signal.

Significant mismatches between the spectra of the predicted audio signal and the masker may demand gain increases to mask the predicted audio signal. The gain level demanded may become larger than desirable, e.g., for plausibility or comfort. An embodiment may select at least one alternative masking sound and repeat the predicting of masking with the alternative masking sound. Optionally, a gain may be selected alternatively in relation to the alternative masking predictions in step 207.

One of the masker candidates is selected in step 208 according to a decision rule. An embodiment may select a masker based, at least in part, on one or more criteria. For example, a decision function related to step 208 may, from among multiple candidate maskers, select the masker that demands the least gain. In step 106, the selected masking sound is inserted into the audio stream to mask the gap or defect.

Temporal induction functions in a wide range of listening situations. However, temporal induction is not always practical as a means of concealing dropouts in an audio signal. For example, inserting noise bursts into a telephone conversation to induce the continuity illusion may create a user experience that is inferior to doing nothing to conceal the dropouts. Temporal induction is practical only in applications where the maskers used to induce the continuity illusion are appropriate for the application.

For example, an embodiment may be used with an application for online gaming with live chat. In online gaming with live chat, a user receives audio that originates from two groups of sources. The first group of audio sources comprises coded voice signals, which are received in real time over a packet switched data network. Audio sources transmitted over packet switched networks in real time may be subject to lost data packets and attendant (e.g., concomitant) dropouts in the voice signal.

The second group of audio sources comprises multiple ambience sounds, which are created by the game engine (and perhaps ambient noise or other sound associated with the physical milieu in which the user and the game engine are disposed or situated). A typical game sound scene comprises a superposition of several sounds, a number of which (perhaps many) have short durations. Examples include thunder claps, gun shots, explosions and the like.

Ambience sounds may typically be stored in locations physically proximate to the user, such as at a data storage device local to the user. Thus, playback of locally stored sounds may be initiated dynamically based, at least in part and perhaps significantly, on the progression of game play. In some instances, the timing with which ambiance sounds are played can be varied considerably without significant negative impact on the plausibility of a sound scene. Embodiments with temporal induction functions providing dropout concealment are useful and practical in such applications.

Figure 3:
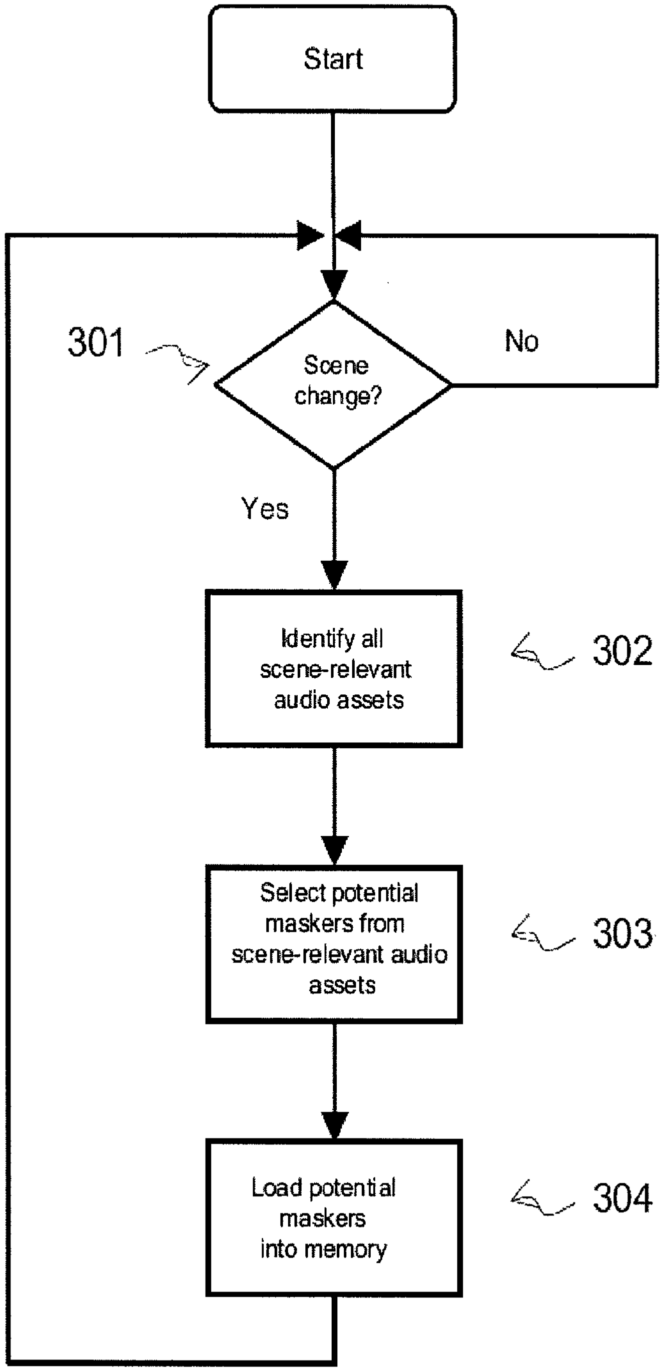
FIG. 3 depicts a flowchart for a third example process, according to an embodiment of the present invention.

FIG. 3 depicts a flowchart for a third example process 300, according to an embodiment of the present invention. Process 300 may be useful and/or integrated with an application such as a game engine. In step 301, a decision is made whether a change of an auditory scene has occurred. If a scene change occurred, then in step 302, scene-relevant audio assets (e.g., all of the audio assets accessible) are identified.

Not all of the scene-relevant audio assets may be suitable for dropout concealment. For example, audio assets that are excessively long, have an unsuitably narrow frequency range, or would be implausible if played at the levels necessary to mask a typical speech signal, may not suffice for practical dropout concealment. Thus in step 303, a subset of audio assets is selected, which are suitable for dropout concealment, from among the scene-relevant audio assets. In step 304, the selected subset of audio assets are made available (e.g., provided) for dropout concealment according to processes 100 and/or 200 (FIG. 1, FIG. 2).

Example Computer System Implementation Platform

Embodiments of the present invention, such as a part of procedures 100, 200 and 300 (FIG. 1, FIG. 2, FIG. 3) may be implemented with a computer system, systems configured in electronic circuitry and components, an integrated circuit (IC) device such as a microcontroller, a field programmable gate array (FPGA), or an application specific IC (ASIC), and/or apparatus that includes one or more of such systems, devices or components.

Figure 4:
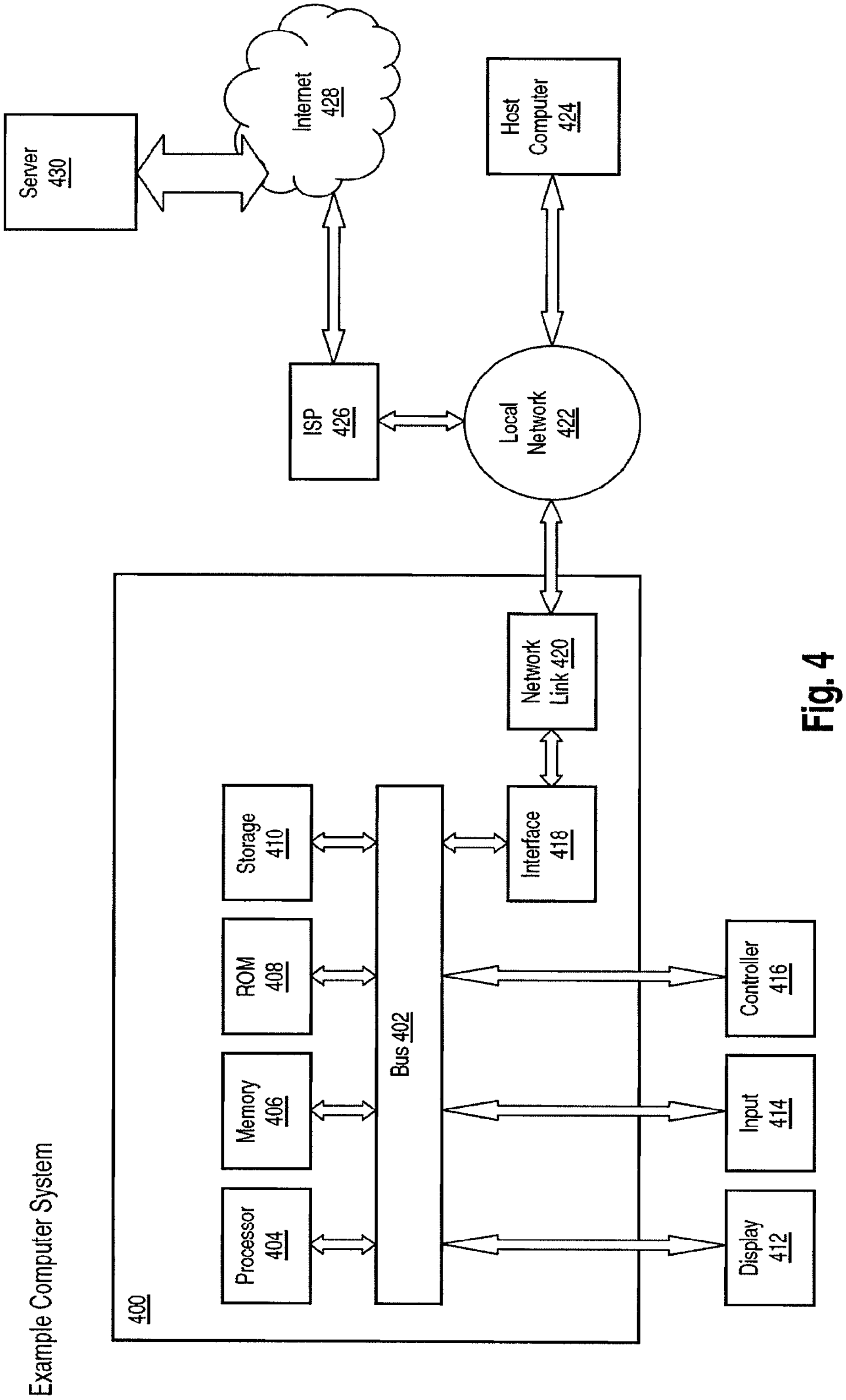
FIG. 4 depicts an example computer system platform, with which an embodiment of the present invention may be implemented.

FIG. 4 depicts an example computer system platform 400, with which an embodiment of the present invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions. Processor 404 may perform one or more digital signal processing (DSP) functions. Additionally or alternatively, DSP functions may be performed by another processor or entity (represented herein with processor 404).

Computer system 400 may be coupled via bus 402 to a display 412, such as a liquid crystal display (LCD), cathode ray tube (CRT) or the like, for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for concealing audio artifacts. According to one embodiment of the invention, concealing audio artifacts is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein may refer to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and other conductors and fiber optics, including the wires that comprise bus 402. Transmission media can also take the form of acoustic or electromagnetic (e.g., light) waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other legacy or other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a digital subscriber line (DSL), cable or other modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for implementing media fingerprints that reliably conform to media content, as described herein.

The received code may be executed by processor 404 as it is received, and/or stored in storage device 410, or other non-volatile storage for later execution. In this manner, computer system 400 may obtain application code in the form of a carrier wave.

Example IC Platform

Figure 5:
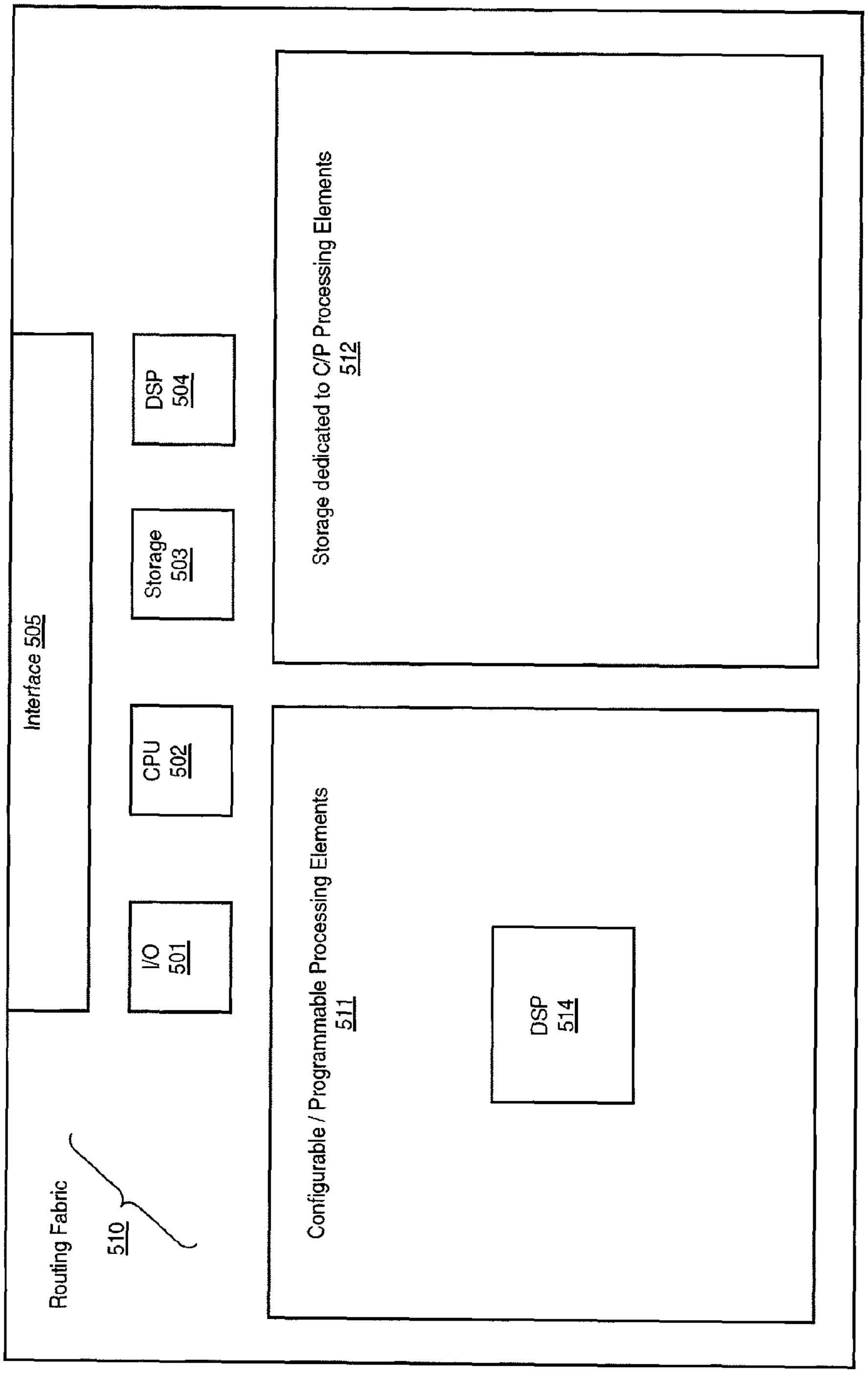
FIG. 5 depicts an example integrated circuit device platform, with which an embodiment of the present invention may be implemented.

FIG. 5 depicts an example IC device 500, with which an embodiment of the present invention may be implemented. IC device 500 may have an input/output (I/O) feature 501. I/O feature 501 receives input signals and routes them via routing fabric 510 to a central processing unit (CPU) 502, which functions with storage 503. I/O feature 501 also receives output signals from other component features of IC device 500 and may control a part of the signal flow over routing fabric 510. A digital signal processing (DSP) feature performs at least function relating to digital signal processing. An interface 505 accesses external signals and routes them to I/O feature 501, and allows IC device 500 to export signals. Routing fabric 510 routes signals and power between the various component features of IC device 500.

Configurable and/or programmable processing elements (CPPE) 511, such as arrays of logic gates may perform dedicated functions of IC device 500, which in an embodiment may relate to extracting and processing media fingerprints that reliably conform to media content. Storage 512 dedicates sufficient memory cells for CPPE 511 to function efficiently. CPPE may include one or more dedicated DSP features 514.

Embodiments of the present invention relate to concealing audio artifacts. At least one segment is identified in an audio signal. The audio segment is associated with an artifact within the audio signal and has a time duration. At least one stored sound clip is retrieved, which has a time duration that matches or exceeds the time duration associated with the audio segment. The retrieved sound clip is mixed with the audio signal and the retrieved sound clip audibly compensates for the audio artifact. The audio artifact may include a missing portion or a corruption of data components of the audio segment. An audio stream may be received, which includes multiple packets of encoded audio data. The audio signal is assembled from the received audio packets.

The sound clips may be stored in a repository. Retrieving the sound clips may include detecting the audio artifact in the identified at least one audio segment, querying the repository based on a characteristic of the audio artifact, and returning the sound clip in response to the query, based on a match between the sound clip and the artifact characteristic. The artifact characteristic may include the time duration that corresponds to the identified segment and at least one audio property corresponding to the audio artifact.

Upon detecting the audio artifact, retrieving the sound clips may include determining the characteristic of the audio artifact, in which the query is performed in response to detecting the artifact or the determining the characteristic thereof. The characteristic of the audio artifact is frequency related. Determining the characteristic of the artifact may thus include predicting a spectrum that corresponds to the frequency related characteristic.

Executing the query may include comparing the predicted spectrum with spectral characteristics associated with the stored sound clip. A match may thus include a significant similarity between the predicted audio artifact spectrum and the sound clip spectral characteristics. The significant similarity may include a substantially identical correspondence between the predicted audio artifact spectrum and the sound clip spectral characteristics.

Based at least in part on the comparison of the predicted spectrum with spectral characteristics associated with the stored sound clip, a level associated with the stored sound clip is ascertained. The stored sound clip level may be adjusted accordingly. Mixing the sound clip and the audio signal may thus include mixing the level-adjusted sound clip with the audio segment. Upon the mixing the level-adjusted sound clip with the audio segment, the level-adjusted sound clip significantly, perhaps substantially (or even essentially completely) masks the audio artifact.

Contextual information relating to the stored sound clips may be monitored. Storing the sound clips may thus include updating one or more of the stored sound clips based on the contextual information. The audio signal may relate to a network-based game. Thus, the contextual information may relate to a virtual environment, which is associated with the game. The audio signal may also be associated with a telephony, video or audio conferencing, or related application.

Example Embodiments

Embodiments of the present invention may relate to one or more of the enumerated examples, below.

1. A method, comprising the steps of:
identifying, in an audio signal, at least one audio segment, with a time duration corresponding thereto, wherein the audio segment is associated with an artifact within the audio signal;
retrieving at least one stored sound clip, with a time duration that equals or exceeds the time duration associated with the at least one segment; and
mixing the retrieved at least one sound clip with the audio signal;
wherein the mixing of the at least one retrieved sound clip with the audio signal renders the audio artifact imperceptible.
2. The method as recited in enumerated example embodiment 1 wherein the audio artifact comprises one or more of a missing or corrupted portion of the audio segment.
3. The method as recited in enumerated example embodiment 2, further comprising the steps of:
receiving an audio stream wherein the audio stream comprises a plurality of packets of encoded audio data; and
assembling the audio signal from the received audio packets.
4. The method as recited in enumerated example embodiment 2 wherein a temporal location associated with the missing or corrupted audio segment is completely contained in a temporal location of the audio clip.
5. The method as recited in enumerated example embodiment 1, further comprising the step of:
storing the at least one sound clip in a sound clip repository.
6. The method as recited in enumerated example embodiment 5 wherein the retrieving step comprises the steps of:
detecting the audio artifact in the identified at least one audio segment;
querying the repository based on a characteristic of the audio artifact; and
returning the sound clip in response to the querying step based on a match between the sound clip and the characteristic.
7. The method as recited in enumerated example embodiment 6 wherein the characteristic comprises:
the time duration that corresponds to the identified at least one segment; and
at least one audio property corresponding to the audio artifact.
8. The method as recited in enumerated example embodiment 6 wherein, upon detecting the audio artifact,
the retrieving step further comprises the step of:
determining the characteristic of the audio artifact; and
wherein the querying step is performed in response to at least one of the detecting step or the determining step.
9. The method as recited in enumerated example embodiment 8 wherein the characteristic of the audio artifact is frequency related;
wherein the determining step comprises the steps of:
predicting a spectrum that corresponds to the frequency related characteristic.
10. The method as recited in enumerated example embodiment 9 wherein the querying step comprises the steps of:
comparing the predicted spectrum with spectral characteristics associated with the stored sound clip;
wherein the match comprises a significant similarity between the predicted audio artifact spectrum and the sound clip spectral characteristics.
11. The method as recited in enumerated example embodiment 10 wherein the significant similarity comprises a substantially identical correspondence between the predicted audio artifact spectrum and the sound clip spectral characteristics.
12. The method as recited in enumerated example embodiment 10 further comprising the steps of:
based at least in part on the comparison of the predicted spectrum with spectral characteristics associated with the stored sound clip, ascertaining a level associated with the stored sound clip; and
adjusting the stored sound clip level;
wherein the mixing step comprises the step of:
mixing the level adjusted sound clip with the audio segment;
wherein, upon the mixing step, the level adjusted sound clip significantly masks the audio artifact.
13. The method as recited in enumerated example embodiment 12 wherein, upon the mixing step, the level adjusted sound clip substantially masks the audio artifact.
14. The method as recited in enumerated example embodiment 5, further comprising the step of:
monitoring contextual information relating to the stored sound clips;
wherein the storing step comprises the steps of:
updating one or more of the stored sound clips based on the contextual information.
15. The method as recited in enumerated example embodiment 14 wherein the audio signal relates to a network based game; and
wherein the contextual information relates to a virtual environment, which is associated with the game.
16. A method, comprising the steps of:
identifying, in an audio signal, at least one audio segment, with a time duration corresponding thereto, wherein the audio segment is associated with an artifact within the audio signal;
retrieving at least one stored sound clip, with a time duration that equals or exceeds the time duration associated with the at least one segment; and
mixing the retrieved at least one sound clip with the audio signal;
wherein the mixing of the at least one retrieved sound clip with the audio signal renders the audio artifact imperceptible.
17. The method as recited in enumerated example embodiment 16 wherein the audio artifact comprises one or more of a missing or corrupted portion of the audio segment.
18. The method as recited in enumerated example embodiment 17, further comprising the steps of:
receiving an audio stream wherein the audio stream comprises a plurality of packets of encoded audio data; and
assembling the audio signal from the received audio packets.
19. The method as recited in enumerated example embodiment 17 wherein a temporal location associated with the missing or corrupted audio segment is completely contained in a temporal location of the audio clip.
20. The method as recited in enumerated example embodiment 16, further comprising the step of:
storing the at least one sound clip in a sound clip repository.
21. The method as recited in enumerated example embodiment 20 wherein the retrieving step comprises the steps of:
detecting the audio artifact in the identified at least one audio segment;
querying the repository based on a characteristic of the audio artifact; and
returning the sound clip in response to the querying step based on a match between the sound clip and the characteristic.

22. The method as recited in enumerated example embodiment 21 wherein the characteristic comprises:

the time duration that corresponds to the identified at least one segment; and at least one audio property corresponding to the audio artifact 23. The method as recited in enumerated example embodiment 21 wherein, upon detecting the audio artifact, the retrieving step further comprises the step of:

determining the characteristic of the audio artifact; and wherein the querying step is performed in response to at least one of the detecting step or the determining step.

24. The method as recited in enumerated example embodiment 23 wherein the determining step comprises the steps of:

predicting an auditory representation of the characteristic.

25. The method as recited in enumerated example embodiment 24 wherein the querying step comprises the steps of:

comparing the auditory of the characteristic with the auditory representation of the stored sound clip;

wherein the match comprises the auditory representation of the stored sound clip completely overlapping the auditory representation of the characteristic.

26. The method as recited in enumerated example embodiment 24 wherein the querying step comprises a series of iterative steps of:

comparing the auditory representation of the characteristic with the auditory representation of the stored sound clip to determine whether the auditory representation of the stored sound clip completely overlaps the auditory representation of the characteristic; and conditioned upon the result of the comparing, adjusting the level of the stored sound clip and repeating the comparing, until the auditory representation of the stored sound clip completely overlaps the auditory representation of the characteristic; and wherein the mixing step comprises the step of:

mixing the level-adjusted sound clip with the audio segment.

27. A system, comprising:

means for performing one or more steps of a method recited in one or more of enumerated example embodiments 1-26.

28. A computer based apparatus, comprising:

at least one processor; and a computer readable storage medium comprising instructions which, when executing over the at least one processor, controls the computer to perform one or more steps of a method that is recited in one or more of enumerated example embodiments 1-26.

29. A device, comprising:

a routing fabric;

a plurality of active components coupled with the routing fabric, which are configured to execute at least one of a processing or a logic related function; and a storage medium coupled with the routing function, which comprises instructions that, when executing over the active components, control the device to perform one or more of:

steps of a method that is recited in one or more of enumerated example embodiments 1-26;

configuring the active components; or performing a function related to one or more of:

a system as recited in enumerated example embodiment 27; or an apparatus as recited in enumerated example embodiment 28.

30. A device as recited in enumerated example embodiment 29 wherein the device comprises an integrated circuit.

31. The device as recited in enumerated example embodiment 30 wherein the integrated circuit comprises an application specific integrated circuit.

32. The device as recited in enumerated example embodiment 30 wherein one or more of the routing fabric, the active components, or the storage medium is programmable or configurable.

33. The device as recited in enumerated example embodiment 32 wherein the integrated circuit comprises one or more of:

a programmable logic device;

a microcontroller; or a field programmable gate array.

34. A computer readable storage medium, comprising:

instructions which, when executing over one or more processors, control performance of steps of a method as recited in one or more of enumerated example embodiments 1-26.

35. A computer readable storage medium, comprising instructions which, when executing over one or more processors, control performance of one or more steps of a method as recited in one or more of enumerated example embodiments 1-26.

36. A computer readable storage medium, comprising instructions which, when executing over one or more processors, perform one or more functions, comprising:

controlling one or more functions of steps of one or more of:

a system as recited in enumerated example embodiment 27;

an apparatus as recited in enumerated example embodiment 28; or a device as recited in one or more of enumerated example embodiments 29-33; or configuring or programming one or more of:

the means as recited in enumerated example embodiment 27;

the processor or the medium as recited in enumerated example embodiment 28; or one or more of the routing fabric, the active components, or the medium as recited in one or more of enumerated example embodiments 29-33.

Equivalents, Extensions, Alternatives And Miscellaneous

Example embodiments relating to concealing audio artifacts are thus described. In this foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising the steps of:

identifying, in an audio signal, at least one audio segment, with a time duration corresponding thereto, wherein the audio segment is associated with an artifact within the audio signal;

retrieving at least one stored sound clip, with a time duration that equals or exceeds the time duration associated with the at least one segment; and masking the artifact with which the audio segment is associated by mixing the retrieved at least one sound clip with the audio signal, wherein the mixing of the at least one retrieved sound clip with the audio signal renders the audio artifact imperceptible, and wherein the retrieving at least one stored sound clip comprises:

detecting the audio artifact in the identified at least one audio segment;

querying a repository of stored sound clips based on a characteristic of the audio artifact; and returning the sound clip in response to the querying step based on a match between the sound clip and the characteristic, wherein the characteristic comprises:

the time duration that corresponds to the identified at least one segment; and at least one audio property corresponding to the audio artifact.

2. The method as recited in claim 1 wherein the audio artifact comprises one or more of a missing or corrupted portion of the audio segment; and wherein the method further comprises the steps of:

receiving an audio stream wherein the audio stream comprises a plurality of packets of encoded audio data; and assembling the audio signal from the received audio packets.

3. The method as recited in claim 1 wherein, upon detecting the audio artifact, the retrieving step further comprises the step of: determining the characteristic of the audio artifact; and wherein the querying step is performed in response to at least one of the detecting step or the determining step.

4. The method as recited in claim 3 wherein the characteristic of the audio artifact is frequency related;

wherein the determining step comprises the steps of:

predicting a spectrum that corresponds to the frequency related characteristic; and wherein the querying step comprises the steps of:

comparing the predicted spectrum with spectral characteristics associated with the stored sound clip;

wherein the match comprises a significant similarity between the predicted audio artifact spectrum and the sound clip spectral characteristics.

5. The method as recited in claim 4, further comprising the steps of:

based at least in part on the comparison of the predicted spectrum with spectral characteristics associated with the stored sound clip, ascertaining a level associated with the stored sound clip; and adjusting the stored sound clip level;

wherein the mixing step comprises the step of:

mixing the level adjusted sound clip with the audio segment;

wherein, upon the mixing step, the level adjusted sound clip significantly masks the audio artifact; and wherein, upon the mixing step, the level adjusted sound clip substantially masks the audio artifact.

6. The method as recited in claim 1, further comprising the step of:

monitoring contextual information relating to the stored sound clips;

wherein the storing step comprises the step of updating one or more of the stored sound clips based on the contextual information.

7. The method as recited in claim 6 wherein the audio signal relates to a network based game; and wherein the contextual information relates to a virtual environment, which is associated with the game.

8. A method, comprising the steps of:

identifying, in an audio signal, at least one audio segment, with a time duration corresponding thereto, wherein the audio segment is associated with an artifact within the audio signal;

retrieving at least one stored sound clip, with a time duration that equals or exceeds the time duration associated with the at least one segment; and masking the artifact with which the audio segment is associated by mixing the retrieved at least one sound clip with the audio signal, wherein the mixing of the at least one retrieved sound clip with the audio signal renders the audio artifact imperceptible, wherein the audio artifact comprises one or more of a missing or corrupted portion of the audio segment, and wherein the retrieving at least one stored sound clip comprises:

detecting the audio artifact in the identified at least one audio segment;

querying a repository of stored sound clips based on a characteristic of the audio artifact; and returning the sound clip in response to the querying step based on a match between the sound clip and the characteristic, wherein the characteristic comprises:

the time duration that corresponds to the identified at least one segment; and at least one audio property corresponding to the audio artifact.

9. The method as recited in claim 8, further comprising the steps of:

receiving an audio stream wherein the audio stream comprises a plurality of packets of encoded audio data; and assembling the audio signal from the received audio packets;

wherein a temporal location associated with the missing or corrupted audio segment is completely contained in a temporal location of the audio clip.

10. A system, comprising:

means for identifying, in an audio signal, at least one audio segment, with a time duration corresponding thereto, wherein the audio segment is associated with an artifact within the audio signal;

means for retrieving at least one stored sound clip, with a time duration that equals or exceeds the time duration associated with the at least one segment; and means for masking the artifact with which the audio segment is associated by mixing the retrieved at least one sound clip with the audio signal, wherein the mixing of the at least one retrieved sound clip with the audio signal renders the audio artifact imperceptible, and wherein the means for retrieving at least one stored sound clip comprises:

means for detecting the audio artifact in the identified at least one audio segment;

means for querying a repository of stored sound clips based on a characteristic of the audio artifact; and means for returning the sound clip in response to the querying step based on a match between the sound clip and the characteristic, wherein the characteristic comprises:

the time duration that corresponds to the identified at least one segment; and at least one audio property corresponding to the audio artifact.

11. A system, comprising: at least one processor; and a computer readable storage medium that comprises instructions, which when executed with the at least one processor, control the processor in performing a process that comprises the steps of:

identifying, in an audio signal, at least one audio segment, with a time duration corresponding thereto, wherein the audio segment is associated with an artifact within the audio signal;

retrieving at least one stored sound clip, with a time duration that equals or exceeds the time duration associated with the at least one segment; and masking the artifact with which the audio segment is associated by mixing the retrieved at least one sound clip with the audio signal, wherein the mixing of the at least one retrieved sound clip with the audio signal renders the audio artifact imperceptible, and wherein the retrieving at least one stored sound clip comprises:

detecting the audio artifact in the identified at least one audio segment;

querying a repository of stored sound clips based on a characteristic of the audio artifact; and returning the sound clip in response to the querying step based on a match between the sound clip and the characteristic, wherein the characteristic comprises:

the time duration that corresponds to the identified at least one segment; and at least one audio property corresponding to the audio artifact.

12. A non-transitory computer readable storage medium product comprising encoded instructions, which when executed with a processor, control the processor to execute a process that comprises the steps of:

identifying, in an audio signal, at least one audio segment, with a time duration corresponding thereto, wherein the audio segment is associated with an artifact within the audio signal;

retrieving at least one stored sound clip, with a time duration that equals or exceeds the time duration associated with the at least one segment; and masking the artifact with which the audio segment is associated by mixing the retrieved at least one sound clip with the audio signal, wherein the mixing of the at least one retrieved sound clip with the audio signal renders the audio artifact imperceptible, and wherein the retrieving at least one stored sound clip comprises:

detecting the audio artifact in the identified at least one audio segment;

querying a repository of stored sound clips based on a characteristic of the audio artifact; and returning the sound clip in response to the querying step based on a match between the sound clip and the characteristic, wherein the characteristic comprises:

the time duration that corresponds to the identified at least one segment; and at least one audio property corresponding to the audio artifact.

13. A use for a computer system that conceals an audio artifact with execution of a process, which comprises the steps of:

identifying, in an audio signal, at least one audio segment, with a time duration corresponding thereto, wherein the audio segment is associated with an artifact within the audio signal;

retrieving at least one stored sound clip, with a time duration that equals or exceeds the time duration associated with the at least one segment; and masking the artifact with which the audio segment is associated by mixing the retrieved at least one sound clip with the audio signal, wherein the mixing of the at least one retrieved sound clip with the audio signal renders the audio artifact imperceptible, and wherein the retrieving at least one stored sound clip comprises:

detecting the audio artifact in the identified at least one audio segment;

querying a repository of stored sound clips based on a characteristic of the audio artifact; and returning the sound clip in response to the querying step based on a match between the sound clip and the characteristic, wherein the characteristic comprises:

the time duration that corresponds to the identified at least one segment; and at least one audio property corresponding to the audio artifact.

14. An integrated circuit (IC) device, comprising:

a routing fabric that couples signals, instructions or data between two or more components of the IC device;

a processing component coupled with the routing fabric; and a storage medium component coupled to the routing fabric, which stores instructions that are readable by the processing component wherein, upon executing the instructions with the processing component, the IC device is controlled to perform a process for concealing an audio artifact, which comprises the steps of:

identifying, in an audio signal, at least one audio segment, with a time duration corresponding thereto, wherein the audio segment is associated with an artifact within the audio signal;

retrieving at least one stored sound clip, with a time duration that equals or exceeds the time duration associated with the at least one segment; and masking the artifact with which the audio segment is associated by mixing the retrieved at least one sound clip with the audio signal, wherein the mixing of the at least one retrieved sound clip with the audio signal renders the audio artifact imperceptible, and wherein the retrieving at least one stored sound clip comprises:

detecting the audio artifact in the identified at least one audio segment;

querying a repository of stored sound clips based on a characteristic of the audio artifact; and returning the sound clip in response to the querying step based on a match between the sound clip and the characteristic, wherein the characteristic comprises:

the time duration that corresponds to the identified at least one segment; and at least one audio property corresponding to the audio artifact.

* * * * *